United States Patent [19]

Kawata et al.

[11] Patent Number: 4,990,585

[45] Date of Patent: Feb. 5, 1991

[54] HEXENE-1-METHYLPENTENE-1 RANDOM COPOLYMER AND PROCESS FOR PRODUCING THE SAME

[75] Inventors: Takashi Kawata, Mie; Hideo Katsumata, Yokkaichi; Kenya Makino, Kuwana, all of Japan

[73] Assignee: Japan Synthetic Rubber Company, Ltd., Tokyo, Japan

[21] Appl. No.: 396,826

[22] Filed: Aug. 21, 1989

Related U.S. Application Data

[63] Continuation of Ser. No. 130,621, Dec. 9, 1987, abandoned.

[30] Foreign Application Priority Data

Dec. 13, 1986 [JP] Japan ................................. 61-295765

[51] Int. Cl.$^5$ ............................................ C08F 210/14
[52] U.S. Cl. .................................. 526/348.5; 524/579; 526/125; 526/348.4
[58] Field of Search ............................ 526/348.4, 348.5

[56] References Cited

U.S. PATENT DOCUMENTS

| | | | |
|---|---|---|---|
| 3,029,215 | 4/1962 | Campbell | 526/348.4 |
| 3,093,624 | 6/1963 | Gresham et al. | 526/348.5 |
| 3,489,735 | 1/1970 | Clark et al. | 526/348.4 |
| 3,795,616 | 3/1974 | Heilman et al. | 526/348.5 |
| 4,613,712 | 9/1986 | Bridger | 526/348.5 |

FOREIGN PATENT DOCUMENTS 963270 7/1964 United Kingdom ................ 526/159

*Primary Examiner*—Edward J. Smith
*Attorney, Agent, or Firm*—Oblon, Spivak, McClelland, Maier & Neustadt

[57] ABSTRACT

A hexene-1 methylpentene-1 random copolymer composed of 65 to 90% by weight of hexene-1 unit and 35 to 10% by weight of 4-methylpentene-1 unit and having a polystyrene-reduced number average molecular weight of 20,000 to 500,000, which copolymer is useful in applications as rubber vibration insulators, modifiers for plastics and rubbers and adhesives. Said random copolymer is produced by copolymerizing 60 to 95% by weight of hexene-1 with 40 to 50% by weight of 4-methylpentene-1 in the presence of a Ziegler-Natta catalyst comprising a transition metal component and an organometal compound component.

2 Claims, 1 Drawing Sheet

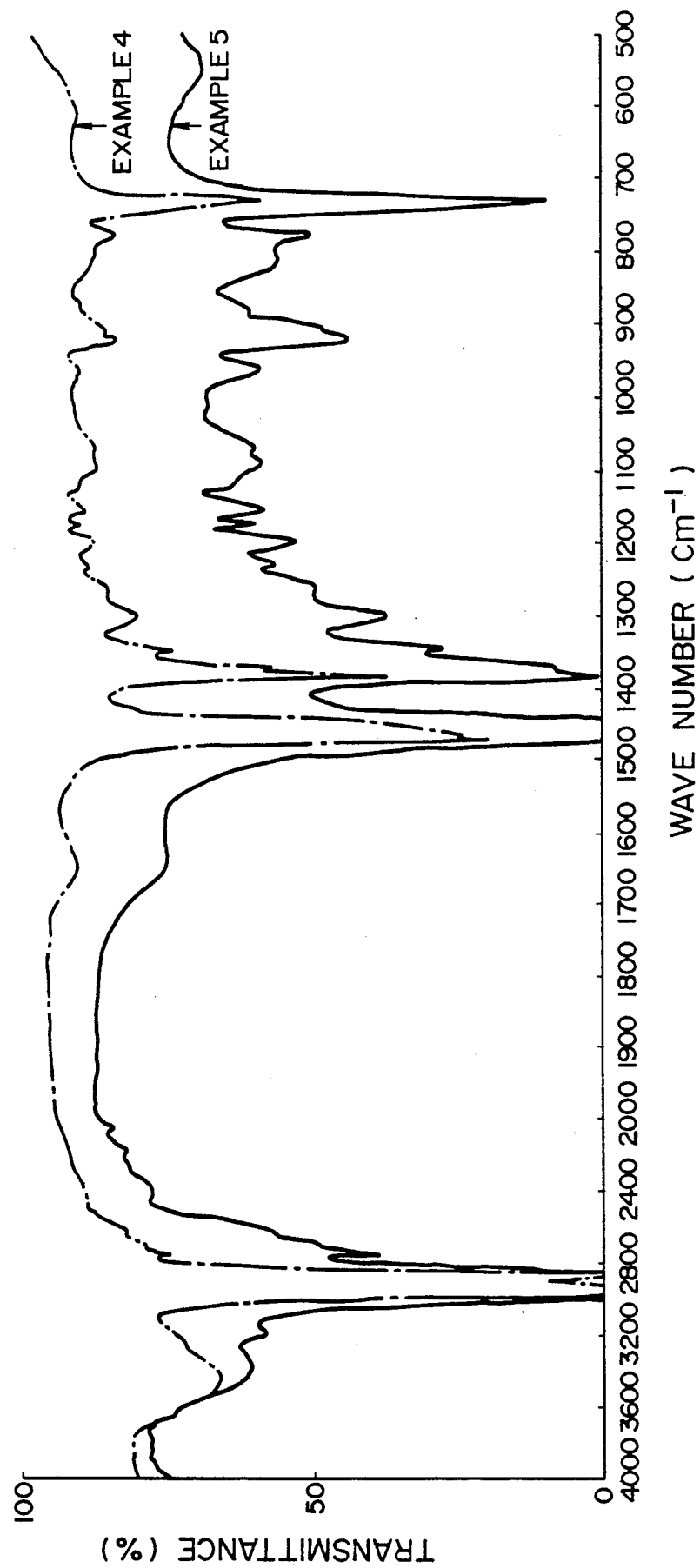

HEXENE-1-METHYLPENTENE-1 RANDOM COPOLYMER AND PROCESS FOR PRODUCING THE SAME

This application is a continuation of application Ser. No. 130,621, filed on Dec. 9, 1987, now abandoned.

BACKGROUND OF THE INVENTION

1. Field of the Invention

This invention relates to a novel hexene-1-methylpentene-1 random copolymer, and more particularly, to a novel hexene-1-methylpentene-1 random copolymer having a hexene-1 content of 65 to 90% by weight which is useful in applications as rubber vibration insulators such as vibration dampers and the like; modifiers for plastics and rubbers; adhesives; etc.

2. Description of Prior Art

In applications as rubber vibration insulators, particularly fields requiring damping properties, butyl rubber has heretofore been used which is excellent in vibration-damping capacity. However, this has not been perfect for insulating vibration.

SUMMARY OF THE INVENTION

An object of this invention is to provide a novel copolymer having superior in vibration-damping capacity to butyl rubber.

Other objects and advantages of this invention will become apparent from following description.

According to this invention, there is provided a hexene-1-methylpentene-1 random copolymer composed of 65 to 90% by weight of the following recurring unit (A) and 35 to 10% by weight of the following recurring unit (B) and having a polystyrene-reduced number average molecular weight of 20,000 to 500,000:

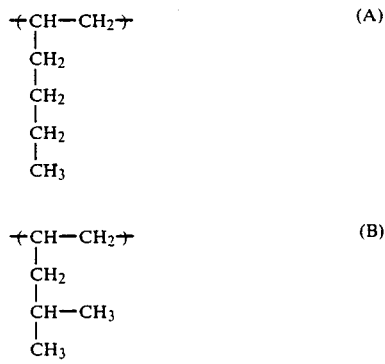

BRIEF DESCRIPTION OF THE DRAWINGS

The drawings show infrared absorption spectra of the copolymers of this invention obtained in Examples 4 and 5 which appear hereinafter.

DETAILED DESCRIPTION OF THE INVENTION

The hexene-1 content in the copolymer of this invention is 65 to 90% by weight, preferably 65 to 80% by weight, and when the content is less than 65% by weight, the copolymer obtained exhibits crystallinity in some cases, and when it is more than 90% by weight, the vibration-damping capacity of the copolymer becomes low and the rebound resilience of the copolymer becomes large or the tan δ value of the copolymer becomes low.

The hexene-1 content in the copolymer of this invention can be determined by an infrared spectroscopic analysis. For example, the ratio of the absorption spectrum of the copolymer at about 730 cm$^{-1}$ to that at about 1,170 cm$^{-1}$ is determined, and the hexene-1 content is then determined by comparing the ratio with the calibration curve previously prepared from sample mixtures of polyhexene-1 and poly(4-methylpentene-1) having known mixing ratios.

The polystyrene-reduced number average molecular weight of the copolymer of this invention ranges from 20,000 to 500,000, preferably from 30,000 to 200,000, and when it is less than 20,000, the mechanical strength of the copolymer obtained is lowered, and when it is more than 500,000, the workability of the copolymer at the time of handling, for example, roll-windability, becomes inferior.

The maximum value of endothermic peak of the copolymer of this invention based on a differential scanning calorimeter (DSC) ranges preferably from −35° C. to −20° C., more preferably from −28° C. to −20° C. When this maximum value is lower than −35° C., the vibration-damping capacity of the copolymer obtained becomes low, and when it is higher than −20° C. the frequency dependency of the vibration-damping capacity becomes great.

This maximum value of endothermic peak can be determined in the following manner:

A sample is set on a differential scanning calorimeter (DuPont 900, manufactured by DuPont, U.S.A.), the temperature is elevated to 260° C., and the sample is thereafter gradually cooled to −100° C. at a rate of 10° C./min, after which the temperature is elevated at a rate of 20° C./min. From the melting peak obtained thereby, the peak top value is read and used as the maximum value of endothermic peak.

The structure of the novel hexene-1-methyl-pentene-1 random copolymer of this invention can be confirmed from absorption due to CH$_3$ of the n-butyl group in the hexene-1 unit at about 730 cm$^{-1}$, absorption due to CH$_3$ of the i-butyl group in the 4-methylpentene unit at about 1,170 cm$^{-1}$, absorption due to CH$_3$ of the i-butyl group in the 4-methylpentene unit at about 1,370 cm$^{-1}$ and the like in the infrared absorption spectrum of the copolymer, and the composition ratio can be confirmed from the calibration curves of the infrared absorption spectrum as mentioned above.

The hexene-1-methylpentene-1 random copolymer of this invention can easily be produced by, for example, copolymerizing 60 to 95% by weight of hexene-1 with 40 to 5% by weight of 4-methylpentene-1 in the presence of a Ziegler-Natta catalyst.

The Ziegler-Natta catalyst used in the production of the copolymer of this invention may be any Ziegler-Natta catalyst in which the transition metal component is a titanium compound or its composition, and a heterofore known titanium compound may be used as the transition metal component.

Examples of the titanium compound or its composition include (a) titanium halide compounds such as titanium tetrachloride, titanium trichloride or its composition, for example, TiCl$_3$-nAlCl$_3$, titanium dichloride or its composition, and the like; and (b) so-called carrier-supported catalyst components in which a titanium compound such as titanium tetrachloride, ethoxytitanium trichloride, titanium trichloride, tetrabutoxytitanium or the like is supported on a carrier [the carrier means herein not only compounds which act as merely carriers, but also compounds which form complicated complexes with the titanium compounds and other optional components and act delicately on the polymerization activity, stereoregularity, molecular weight distribution and the like, such as silica, alumina, silica-alumina, titania, magnesia, magnesium chloride or its composition (for example, composition of magnesium chloride and Lewis acid), magnesium oxychloride, reaction product of magnesium oxychloride with an alkylaluminum dichloride] with or without an electron-donating compound such as an organic acid ester, water, an amine, an ether or the like.

In this invention, the composition of the titanium compound consists mainly of the above titanium compound, and includes usually compositions containing the titanium compound and not more than 30% by weight, based on the weight of the titanium compound, of an alkylaluminum monohalide and/or a Lewis acid (for example, aluminum chloride, antimony trichloride, phosphorus halide compounds or the like) and/or an electron donor (for example, an ether, an organic acid ester, an organic acid amide, a phosphoric acid amide, an amine, a phosphine and the like), and also includes the above-mentioned carrier-supported components.

The titanium compound or its composition used in this invention includes preferably titanium tetrachloride; titanium trichloride obtained by reducing titanium tetrachloride with a reducing agent such as hydrogen, aluminum, titanium, an organoaluminum or the like or titanium trichloride compositions, for example, TiCl$_3$-nAlCl$_3$; trichloride compositions obtained by cogrinding the titanium trichloride (or its composition) with an electron donor such as an organic acid ester, an ether, a phosphoric acid amide or the like; titanium trichloride compositions obtained by reducing titanium tetrachloride with an organoaluminum and then treating the reduction product with an ether or a Lewis acid; reaction products of magnesium oxychloride with an alkylaluminum dichloride, which products may optionally be reacted with a siloxane compound; or carrier-supported catalyst components in which the carrier is magnesium chloride and an electron donor such as an organic acid ester, an alcohol, an amine, an organic acid amide, an ether or water and a halogen-containing titanium compound such as titanium tetrachloride, titanium trichloride, an alkoxytitanium trichloride or the like are supported as an essential component on the carrier.

On the other hand, the organometal compound component which is the other component of the Ziegler-Natta catalyst, are appropriately organometal compounds of metals of Groups I to III of the Periodic Table, among which organoaluminum compounds are particularly preferred. Usually, examples of organoaluminum compounds which are preferably used include (a) trialkylaluminums such as trimethylaluminum, triethylaluminum, triisobutylaluminum, halides such as diethylaluminum chloride, di-n-propylaluminum chloride, diisobutylaluminum chloride and the like; (c) dialkylaluminum hydrides such as diethylaluminum hydride, diisobutylaluminum hydride and the like; (d) alkylaluminum sesquichlorides such as methylaluminum sesquichloride, ethylaluminum sesquichloride, n-propylaluminum sesquichloride, isobutylaluminum sesquichloride and the like; (e) alkylaluminum dihalides such as methylaluminum dichloride, ethylaluminum dichloride, isopropylaluminum dichloride and the like; (f) dialkylaluminum alkoxides and aryloxides such as diethylaluminum ethoxide, diethylaluminum isopropoxide, di-n-propylaluminum 2,6-di-t-butylphenoxide and the like; and (g) dimethylaluminum trimethylsiloxide, diethylaluminum trimethylsiloxide and the like. Alternatively, reaction products of these organoaluminums with water, secondary amines or organic acid esters may be used in place thereof. These organoaluminum compounds may be used alone or in admixture of two or more.

The polymerization conditions for producing the copolymer of this invention are such that the polymerization temperature ranges from 0° C. to 200° C., preferably from 20° C. to 150° C., the polymerization pressure ranges from 0 to 150 kg/cm$^2$·G, preferably from 0 to 50 kg/cm$^2$·G and the polymerization time ranges from 0.1 to 3 hours, preferably from 0.5 to 2 hours.

The amount of the catalyst used is usually 0.003 to 0.5 millimole, preferably about 0.005 to 0.02 millimole, per mole of the total monomer.

The polymerization manner is not critical and there may be used (a) a slurry or solution method using an inert solvent such as n-hexane, n-heptane, n-octane or the like and (b) a slurry or melt method in which substantially no solvent is used and hexene-1 and 4-methylpentene-1 act as a solvent.

The copolymerization may be effected in the presence of a molecular weight regulator, and as the molecular weight regulator, hydrogen and/or an alkylzinc compound may be used.

The novel random copolymer of this invention has an excellent vibration-damping capacity and may, if necessary, be extended with an oil such as an aromatic, naphthenic or paraffinic oil, compounded with conventional compounding agents such as a reinforcing agent, for example, carbon black or the like, a processing oil, a filler, stearic acid, zinc oxide, an antioxidant and the like, and then subjected to molding. The thus molded product is applied to various industrial materials including rubber vibration insulators such as vibration dampers and the like.

DESCRIPTION OF PREFERRED EMBODIMENTS

This invention is explained in more detail referring to Examples below. However, the Examples are not by way of limitation but by way of illustration.

In the Examples, part and percent are by weight unless otherwise specified.

In the Examples, the polystyrene-reduced number average molecular weight was determined as follows according to the method described in Takeuchi, Gel-Permeation Chromatography, published by Maruzen, Japan:

(1) According to a gel permeation chromatography (GPC), the elution volume (EV) of a standard polystyrene having a known molecular weight was measured and a calibration curve between the known molecular weight M and the EV was prepared.

(2) The GPC pattern of a sample was then taken and the EV of the sample was determined, after which the molecular weight of the sample was determined by applying the EV to the calibration curve obtained in (1) above.

In this case, the conditions for preparing a sample and the GPC measurement conditions are as follows:

SAMPLE PREPARATION (a) In an o-dichlorobenzene solvent was dissolved 2,6-di-t-buty-p-cresol at a concentration of 0.08%.

(b) The sample was placed in an Erlenmeyer flask together with an o-chlorobenzene solvent so that the concentration of the sample became 0.1%.

(c) The Erlenmeyer flask was heated to 120° C and the contents of the flask was stirred for about 60 minutes to form a solution.

(d) The resulting solution was subjected to GPC. Incidentally, the solution was automatically filtered through a sintered filter having a pore diameter of 0.5 μm in the GPC apparatus.

GPC MEASUREMENT CONDITIONS (a) Apparatus: Model 150 manufactured by Waters, U.S.A.

(b) Column: Type H manufactured by Toyo Soda Co. Ltd.

(c) Amount of sample: 500 μl (d) Temperature: 120° C.

(e) Flow rate: 1 ml/min.

(f) Number of total theoretical plates of column: $1 \times 10^4$ to $2 \times 10^4$ (value of measurement with acetone).

Also, the test for physical properties (under normal conditions) was conducted according to JIS K6301, and the vibration-insulating characteristics were evaluated by measuring tan δ at 20° C. and 15 Hz, E' at °° C. and 70 Hz and E' at 20° C. and 15 Hz, E' determining the static viscoelasticity/dynamic viscoelasticity ratio (E' at 70 Hz/E' at 1 Hz) and comparing the ratios and tank δ values obtained.

EXAMPLE 1

Catalyst Preparation

Into a stainless steel ball mill which had previously purged with nitrogen were charged 210 millimoles of magnesium chloride, 105 millimoles of tetrabutoxytitanium and 64 ml of n-hexane, the ball mill was set in a vibrating machine, and the resulting mixture was subjected to grinding at room temperature for 7 hours. After the grinding, the whole contents of the ball mill were withdrawn into a nitrogen-sealed vessel and washed with five 400-ml portions of n-hexane therein, after which 400 ml of n-hexane was charged into the vessel. With stirring, a 1 mole/liter solution of 105 millimoles of diethylaluminum chloride in n-hexane was dropped into the resulting mixture, and the mixture was subjected to reaction at room temperature for 5 hours.

The reaction mixture thus obtained was washed with five 400-ml portions of n-hexane in the vessel, and thereafter, 400 ml of n-hexane was charged into the vessel to form a titanium catalyst suspension. The titanium concentration of the titanium catalyst suspension was 0.04 mole/liter.

Polymerization

Into a 200-ml flask which had previously been purged with nitrogen were charged 50 ml of n-hexane which had been dehydrated and purified by means of a molecular sieve, 8 ml of hexene-1 which had been similarly purified (special grade chemical) and 2 ml of 4-methylpentene-1 which had been similarly purified (special grade chemical), and 2 millimoles of triisobutylaluminum and the above titanium catalyst suspension (0.04 millimole in terms of titanium atom) were then charged thereinto with thorough stirring to start the copolymerization.

The copolymerization was carried out at 30° C. for 30 minutes, and thereafter, 1 ml of i-propyl alcohol was added to the copolymerization mixture to terminate the copolymerization, after which the copolymerization mixture was poured into a large amount of methanol to coagulate the copolymer. The copolymer was taken out and dried in vacuo.

The amount of the copolymer obtained was 2.0 g and the hexene-1 content thereof was 68%. Also, the maximum value of endothermic peak determined by DSC was −23° C., and the polystyrene-reduced number average molecular weight of the copolymer was 40,000.

EXAMPLE 2

The same procedure as in Example 1 was repeated, except that the amount of triisobutylaluminum was changed to 50 millimoles and 1 millimole of titanium tetrachloride was substituted for the titanium compound, to obtain a copolymer.

The amount of the copolymer obtained was 0.26 g and the hexene-1 content of the copolymer was 72%. Also, the maximum value of endothermic peak of the copolymer determined by DSC was −24° C. and the polystyrene-reduced number average molecular weight of the copolymer was 21,000.

EXAMPLE 3

Catalyst Preparation

Into a stainless steel ball mill which had previously been purged with nitrogen were charged 100 millimoles of magnesium chloride, 7.5 millimoles of ethyl benzoate, 15 millimoles of titanium tetrachloride and 64 ml of n-hexane, the ball mill was set in a vibrating machine, and the resulting mixture was subjected to grinding at room temperature for 7 hours. After the grinding, the whole contents of the ball mill were withdrawn into a nitrogen-sealed vessel, and washed with five 400-ml portions of n-hexane therein. Into the vessel was charged 700 ml of n-hexane to form a titanium catalyst suspension. The titanium concentration of the titanium catalyst suspension thus obtained was 0.02 mole/liter.

Polymerization

The same procedure as in Example 1 was repeated, except that the amount of triisobutylaluminum was changed to 1 millimole and the titanium catalyst suspension prepared above was used in an amount of 0.01 millimole in terms of titanium atom, to obtain a copolymer.

The amount of the copolymer obtained was 2.5 g, and the hexene-1 content of the copolymer was 69%. Also, the maximum value of endothermic peak of the copolymer determined by DSC was −23° C. and the polystyrene-reduced number average molecular weight of the copolymer was 38,000.

EXAMPLE 4

The same procedure as in Example 1 was repeated, except that the amount of hexene-1 was changed to 9 ml and the amount of 4-methylpentene-1 was changed to 1 ml, to obtain a copolymer. The amount of the copolymer obtained was 2.6 g and the hexene-1 content of the copolymer was 78%. Also, the maximum value of exothermic peak of the copolymer determined by DSC was −26° C. and the polystyrene-reduced number average molecular weight of the copolymer was 46,000. Incidentally, the infrared absorption spectrum of the copolymer obtained is shown in the accompanying drawings.

COMPARATIVE EXAMPLE 1

The same procedure as in Example 1 was repeated, except that the amount of hexene-1 was changed to 2.5 ml and the amount of 4-methylpentene-1 was changed to 7.5 ml, to obtain a copolymer. The amount of the copolymer obtained was 1.3 g and the hexene-1 content of the copolymer was 35%.

Also, the maximum value of endothermic peak of the copolymer determined by DSC was 15° C. and the poly-styrene-reduced molecular weight of the copolymer was intended to be measured by GPC, but the measurement was impossible because the copolymer was not completely dissolved in o-dichlorobenzene.

COMPARATIVE EXAMPLE 2

The same procedure as in Example 1 was repeated, except that the amount of hexene-1 was changed to 5 ml and the amount of 4-methylpentene-1 was changed to 5 ml, to obtain a copolymer. The amount of the copolymer obtained was 2.4 g and the hexene-1 content of the copolymer was 42%.

Also, the maximum value of endothermic peak of the copolymer determined by DSC was 3° C., and the polystyrene-reduced molecular weigh of the copolymer was 40,000.

COMPARATIVE EXAMPLE 3

The same procedure as in Example 1 was repeated, except that the amount of hexene-1 was changed to 1 ml and the amount of 4-methylpentene-1 was changed to 9 ml, to obtain a copolymer. The amount of the copolymer obtained was 1.2 g and the hexene-1 content of the copolymer was 15%.

Also, the maximum value of endothermic peak of the copolymer determined by DSC was 31° C. and the polystyrene-reduced number average molecular weight of the copolymer was intended to be measured by GPC, but the measurement was impossible because the copolymer was not completely dissolved in a o-chlorobenzene.

EXAMPLE 5

The same procedure as in Example 3 was repeated, except that the amount of hexene-1 was changed to 270 ml, the amount of 4-methylpentene-1 was changed to 30 ml, the amount of n-hexane was changed to 1.5 liters, the amount of the titanium catalyst suspension was changed to 0.25 millimole in terms of titanium atom and the amount of triisobutylaluminum was changed to 25 millimoles, to obtain a copolymer. Ihe amount of the copolymer obtained was 188 g and the hexene-1 content of the copolymer was 71%. Also, the maximum value of endothermic peak of the copolymer determined by DSC was −24° C. and the polystyrene-reduced number average molecular weight of the copolymer was 42,000. Incidentally, the infrared absorption spectrum of the copolymer is shown in the accompanying drawings.

COMPARATIVE EXAMPLE 4

The same procedure as in Example 5 was repeated, except that each of the amounts of hexene-1 and 4-methylpentene-1 was changed to 150 ml, to obtain a copolymer. The amount of the crpolymer obtained was 162 g and the hexene-1 content of the copolymer was 49%.

Also, the maximum value of endothermic peak of the copolymer determined by DSC was −3° C. and the polystyrene-reduced number average molecular weight of the copolymer was 38,000.

COMPARATIVE EXAMPLE 5

The same procedure as in Example 5 was repeated, except that the amount of hexene-1 was changed to 300 ml and the 4-methylpentene-1 was not used, to obtain a polymer. The amount of the polymer produced was 100 g, the maximum value of endothermic peak of the polymer determined by DSC was −38° C., and the polystyrene-reduced number average molecular weight of the polymer was 50,500.

TEST EXAMPLES 1 to 5

The polymers obtained in Example 5 and Comparative Examples 4 and 5 and butyl rubber (JSR Butyl 268 manufactured by Nippon Butyl Kabushiki Kaisha) were subjected with the following compounding recipes to kneading in a 250-cc plastomill at 60 rpm for 4 minutes, and cross-linking agents as shown below were added to the resulting mixtures on 4-inch rolls to prepare compounds:

| Comounding Recipes Components (parts) | Test Ex. 1-3 | Test Ex. 4 | Test Ex. 5 |
|---|---|---|---|
| Polymer | 100 | 100 | 100 |
| Zinc white | 5 | 5 | 5 |
| Stearic acid | 1 | 1 | 1 |
| GPF black*1 | 70 | 70 | 100 |
| Paraffinic oil*2 | 25 | 25 | — |
| Cross-linking agents | | | |
| Dicumyl peroxide*3 | 3 | — | 3 |
| Sulfur | 0.3 | 2 | 0.3 |
| Vulcanization accelerator | | | |
| MBT*4 | — | 0.5 | — |
| TMTD*5 | — | 1 | — |

Note:
*1Diablack G manufactured by Mitsubishi Chemical Industries, Ltd.
*2Fuccol P400 manufactured by Fuji Kosan Co., Ltd.
*3Percumyl D manufactured by Nippon Oil & Fats Co., Ltd.
*4Mercaptobenzothiazol (Nocceler M manufactured by Ohuchi Shinko Chemical Industry Co., Ltd.)
*5Tetramethylthiuram disulfide (Nocceler TT manufactured by Ohuchi Shinko Chemical Industry Co., Ltd.)

The compounds thus obtained were press-vulcanized at 160° C. for 30 minutes and subjected to test for physical properties. The results obtained are shown in Table 1. As is clear from Table 1, the polymer obtained in Example 5 (Test Ex. 1 and 5) had a greater tan δ value and a smaller rebound resilience than butyl rubber (Test Ex. 4), and exhibited excellent vibration-damping capacity.

Also, the frequency-dependency (static viscoelasticity/dynamic viscoelasticity ratio) of the polymer obtained in Example 5 was found to be good though it was inferior to that of butyl rubber.

Moreover, in Test Example 2 in which the polymer obtained in Comparative Example 4 was used, the tan δ value was great and the vibration-damping capacity was great, but the frequency-dependency was too large and in Test Example 3 in which the polymer obtained in Comparative Example 5 was used, the tan δ value was small and the vibration-damping capacity was inferior.

TABLE 1

| | Test Example No. | | | | |
|---|---|---|---|---|---|
| | 1 | 2 | 3 | 4 | 5 |
| Polymer | Example 5 | Comp. Ex. 4 | Comp. Ex. 5 | Butyl rubber | Example 5 |
| Physical properties under normal conditions | | | | | |
| $M_{100}$ (Kg/fcm$^2$) | 4 | 10 | 4 | 20 | 39 |
| $T_B$ (Kg/fcm$^2$) | 52 | 54 | 50 | 98 | 100 |
| $E_B$ (%) | 630 | 500 | 510 | 530 | 210 |
| $H_S$ (JIS A) | 28 | 33 | 28 | 56 | 63 |
| Rebound resilience at 23° C. (%) | 10 | 8 | 14 | 16 | 8 |
| Vibration-insulating properties | | | | | |
| tan δ (20° C., 15 Hz) | 0.493 | 0.521 | 0.376 | 0.315 | 0.464 |
| E' at 70 Hz (dyn/cm$^2$) | 5.63 × 10$^7$ | 9.42 × 10$^7$ | 4.35 × 10$^7$ | 1.18 × 10$^8$ | 2.87 × 10$^8$ |
| E' 1 Hz (dyn/cm$^2$) | 3.16 × 10$^7$ | 3.77 × 10$^7$ | 2.57 × 10$^7$ | 7.60 × 10$^7$ | 1.51 × 10$^8$ |
| Static viscoelasticity/ dynamic viscoelasticity (E' at 70 Hz/E' at 1 Hz) | 1.78 | 2.50 | 1.69 | 1.55 | 1.90 |

What is claimed is:

1. A hexene-¼-methylpentene-1 random copolymer composed of 65 to 90% by weight of the following recurring unit (A) and 35 to 10% by weight of the following recurring unit (B) and having a polystyrene-reduced number average molecular weight of 20,000 to 500,00:

 (A)

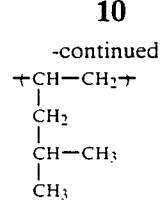 (B)

wherein said copolymer has a maximum value of the endothermic peak determined by a differential scanning calorimeter ranging from −35° C. to −20° C.

2. A hexane-¼-methylpentene-1 random copolymer composed of 65 to 90% by weight of the following recurring unit (A) and 35 to 10% by weight of the following recurring unit (B) and having a polystyrene-reduced number average molecular weight of 20,000 to 500,000:

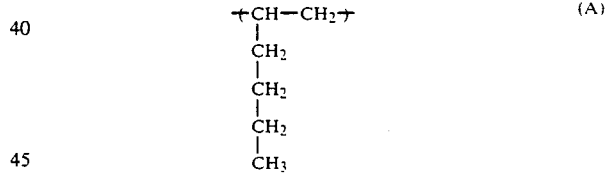 (A)

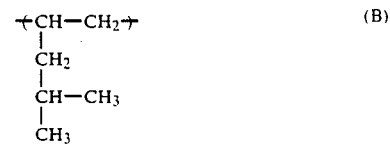 (B)

wherein said copolymer has a maximum value of the endothermic peak determined by a differential scanning calorimeter ranging from −28° C. to −20° C.

* * * * *